United States Patent [19]

Nootenboom et al.

[11] Patent Number: 4,725,066
[45] Date of Patent: Feb. 16, 1988

[54] MOBILE CART FOR DISCRETE SHELVES, AND SHELF THEREFOR

[75] Inventors: Harold L. Nootenboom, Andover; Ronald L. Rosa, Eagan, both of Minn.

[73] Assignee: Cannon Equipment Co., Cannon Falls, Minn.

[21] Appl. No.: 853,518

[22] Filed: Apr. 18, 1986

[51] Int. Cl.⁴ .............................. B62B 5/00
[52] U.S. Cl. ..................... 280/79.3; 211/126
[58] Field of Search ............... 211/126, 133, 187, 208; 280/47.34, 47.35, 79.3, 79.1 R

[56] References Cited

U.S. PATENT DOCUMENTS

| | | | |
|---|---|---|---|
| 2,936,077 | 5/1960 | Carpenter | 211/126 |
| 2,982,422 | 5/1961 | Asproyerakas | 280/79.3 X |
| 3,199,683 | 8/1965 | Graswich | 211/208 X |
| 4,113,329 | 9/1978 | Thurman | 211/133 X |
| 4,386,703 | 6/1983 | Thompson et al. | 211/126 X |

Primary Examiner—John J. Love
Assistant Examiner—Michael Mar
Attorney, Agent, or Firm—Henry C. Kovar

[57] ABSTRACT

A mobile cart has fixed tray supports for a plurality of discrete and removable trays, the cart has a frame with a base and caster wheels and side frames with corner posts, and a top member structurally connecting the side frames; the trays each have a roll-section formed frame with a perimeter piece, an upper inward turned inverted U-shaped top flange, a lower inward turned floor pad, and a downward facing inverted U-shaped support nest on the bottom of each side of the frame; a tray floor in the frame has a support surface on the floor pads and upturned flanges of less than ninety degrees underneath the top flanges; each side frame has a rear stop peg and front stop peg extending in from respective corner posts, a tray support rail in between the stops, and a hold down peg above and spaced from the rear stop pegs; the tray fits upon the support with the nests upon the rails and the hold down pegs keep the trays in place during transit, the cart and trays are ideally suited for the transport and retailing of flowers, plants and other loose and delicate goods.

10 Claims, 4 Drawing Figures

MOBILE CART FOR DISCRETE SHELVES, AND SHELF THEREFOR

BACKGROUND OF THE INVENTION

1. Field of the Invention

This invention pertains to a mobile cart having discrete removable shelves and structure for holding the shelves in the cart during transit, and to a shelf for this cart.

2. Description of the Prior Art

Carts are being tried and tested for shipment and retailing of plants and flowers. A wholesaler is a typical owner and user of the cart. The cart needs to have adjustable height discrete shelves. The shelves are taken in and out and are placed in the cart frame to best accommodate the specific mix of plants and flowers. Some plants and flowers are tall, some are short. A cart might be set up with six shelves, or with two shelves.

The properly set shelves are loaded with an appropriate mix of plants and flowers, and the loaded cart may then be shrink wrapped to hold in moisture. Most wholesalers do not shrink wrap, but some do; it depends upon the mix, the weather and market demands.

The loaded cart is then eventually placed upon a truck and trucked to a retailer's facility where the loaded cart is taken off the truck and then eventually pushed to a retailing situs, where the flowers and plants are sold directly off the cart. This type of retailing is commonly being tested by large florist chains and in the malls of shopping centers.

The problem is that during transit the shelves jump up and down and in and out of cart frames. The flowers and dirt with the plants are thrown around and the loaded cart ends up being a dirty mess that needs to be unloaded, cleaned and reloaded and rearranged before it can be used for retailing. The flower and plant industry wants these problems solved.

OBJECTS OF THE INVENTION

It is an object of the present invention to provide a new and improved mobile cart for discrete and removable shelves, with new and improved structure for supporting and retaining the shelves during transit of the cart.

It is an object of the present invention to provide a new and improved mobile cart with removable discrete shelves having a new shelf support and an improved shelf construction for better retention of the shelves during transit.

It is an object of the present invention to provide a new and improved shelf for a mobile cart.

It is an object of the present invention to provide a new and improved mobile cart for distribution and retailing of plants and flowers and other small goods.

SUMMARY OF THE INVENTION

A mobile cart for distribution and retailing of goods has a frame with opposed pairs of corner posts, at least one discrete and removable tray, an inverted U-shaped support nest on the bottom of each side of the tray, a pair of opposed tray supports for each shelf with each support having a front stop peg, a rear stop peg and a fore-aft elongate support rail between the pegs, and a hold down peg is above and spaced upward of the rear stop peg a distance which is greater than the height of the tray but less than the combined height of the tray and the nest.

A mobile cart for a plurality of discrete and removable trays has a frame with upright corner posts, pairs of trays supports at various levels with each support being secured to the corner posts and having a front stop peg, a rear stop peg, and an elongate fore-aft support rail between the pegs and inward from respective corner posts, and a tray hold down peg which is above and spaced from the rear stop peg.

A cart tray has a rectangular sheet metal frame with a perimeter piece, an inverted U-shaped top flange, and an upward facing floor pad to the inside of the perimeter piece, a tray floor has a central planar support surface inside of the top flange and resting upon the floor pads, upward extending perimeter flanges formed up less than ninety degrees and tucked under the top flanges, and downward facing support nests under the floor pads on each lateral side of the tray.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

DESCRIPTION OF THE PREFERRED EMBODIMENT

Figure 1:
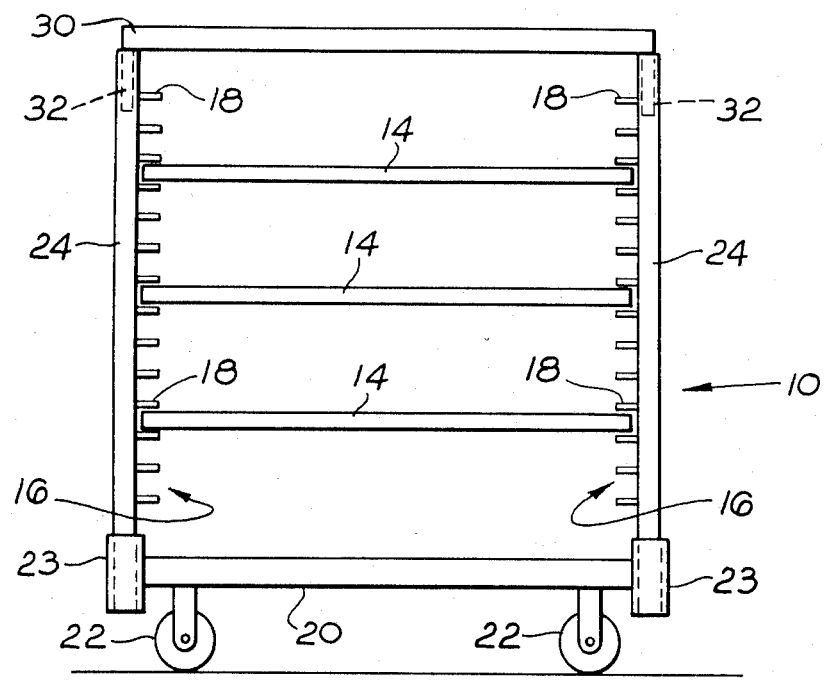
FIG. 1 is a front elevational view of the preferred embodiment of the cart and tray of the present invention.

According to the principles of the present invention, a mobile cart, which is generally indicated by the numeral 10 and which is shown in FIG. 1, has a frame 12, at least one, and most often more, discrete and removable trays 14 which span across the width of the cart 10, and tray supports 16, and tray hold-down pegs 18.

The frame 12 has a base 20 with caster wheels 22 and upward extending corner pockets 23. Opposed side frames 24 each have a discrete upright front corner post 26 and a discrete upright rear corner post 28. The tray supports 16 are welded to both of the corner posts 26, 28 as will be described and each side frame 24 is formed by one front corner post 26, one rear corner post 28, and a plurality of tray supports 16 which are welded to the posts 26, 28 one above another along the entire height of the posts 26, 28. The corner posts 26, 28 are slip fitted into the base corner pockets 23. The front corner posts 26 are preferably shorter than the rear corner posts 28 and an inverted U-shaped top cross member 30 has a pair of opposed end legs 32 which slip-fit to the front corner posts 26. The end legs 32 preferably are cantilevered down and slip fit into the inside of the front corner posts 26. The top cross member 30 is at the same height as the rear corner posts 28 and holds the side frames 24 at a constant fixed spacing from each other. The slip fits of the corner posts 26, 28 to the base pocket 23, and the slip fit of the top cross member 30 to the front corner post 26 enables quick, easy and accurate assembly of the cart frames 12 without requiring tools. The opposed side frames 24 are the mirror image of each other.

The trays 14 are all identical to and interchangeable with each other. Each tray 14 has a roll-section sheet metal perimeter combination frame/rim 34 with the roll-section having an outer and upright generally planar perimeter piece 36, an inverted U-shaped top flange 38 which is turned inward and downward from the perimeter piece 36, and an upward facing floor pad 40. The floor pad 40 extends inward from a U-shaped bottom flange 42 which also extends inward from the perimeter piece 36 and which is the mirror image of the top flange 38. The floor pad 40 is at the top of an inverted U-shaped flange extending inward from the bottom flange 42. The floor pad 40 extends well inward from the innermost extension of the top flange 38. The tray 14 has a sheet metal tray floor 44 which has a central generally planar support surface 46. Each side edge of the support surface 46 has an upward extending perimeter flange 48 which is formed upward less than ninety degrees. The height of each perimeter flange 48 is less than the spacing between the floor pad 40 and the lower inner edge of the top flange 38. The roll formed frame rim 34 is preferably fabricated of rolled low carbon steel or if for very light duty, it may be a metal or plastic extrusion. Regardless, the section of the frame rim 34 is of constant cross section and is mitered and closed up. The frame rim 34 may be painted or powder coated in an appropriate color. The tray floor 44 is preferably imperforate galvanized sheet metal with clipped corners 50 to give drainage off to a side of lower trays and to a side of product on lower trays 34. The support surface 46 of the tray floor 44 is sized smaller than the inside of the top flanges 38, and the top edges of the perimeter flanges 48 are sized larger than the inside of the top flange 38 which enables the tray floor 44 to be pushed downward through the top flange 38 and onto the floor pad 40. The perimeter flanges 48 then resiliently snap outward and tuck under the top flanges 38 and the tray floor is permanently installed in the frame rim 34. The top edges of the perimeter flanges 48 are preferably sized larger than the inside of perimeter piece 36 so that the perimeter flanges 48 are wedged against and preloaded against the perimeter pieces 36. This prevents rattling and oil-canning of the tray floor 44 and the support surface 46. A transversely central fore-aft floor support 52 is welded to an inner flange 54 extending down from the floor pad 40. A support nest 56 is preferably an inverted U-shaped elongate member on each side of the tray 14. The nest 56 is tucked into the inverted U-shape of the floor pad 40 and preferably is sized so that it will slip either on or within the top flange 38 of an identical tray 14 enabling stacking of the trays.

Figure 2:
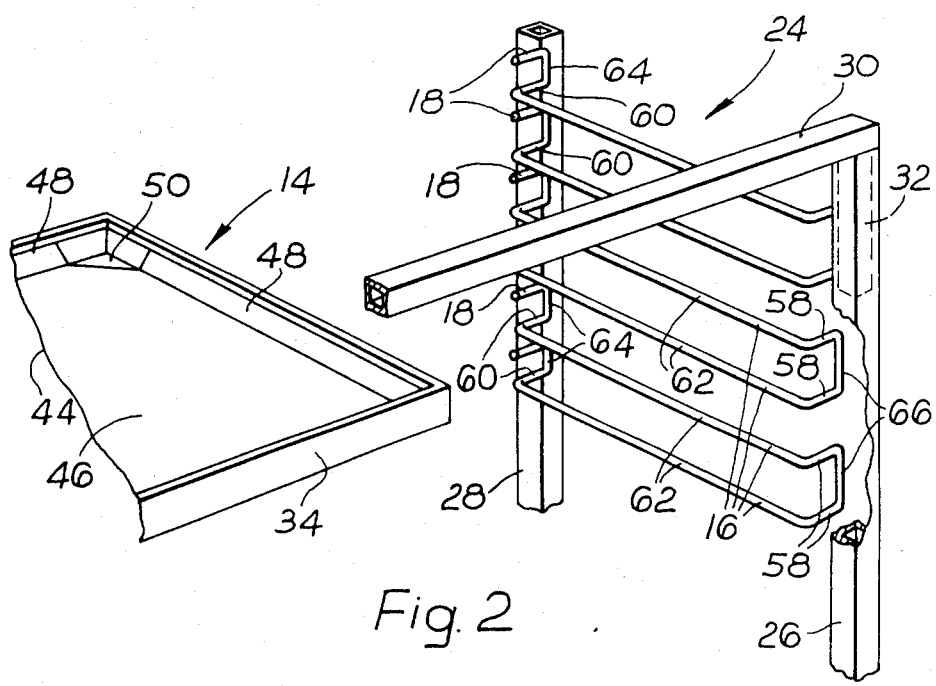
FIG. 2 is a downward looking perspective view of the right side frame and a tray of the structure of FIG. 1.
Figure 3:
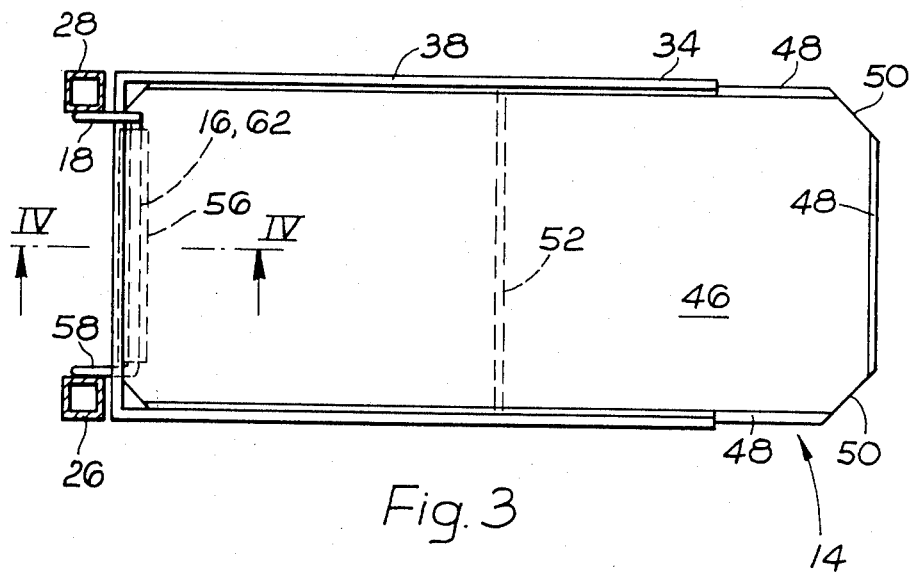
FIG. 3 is a top plan view of the tray in the cart of FIG. 1.
Figure 4:
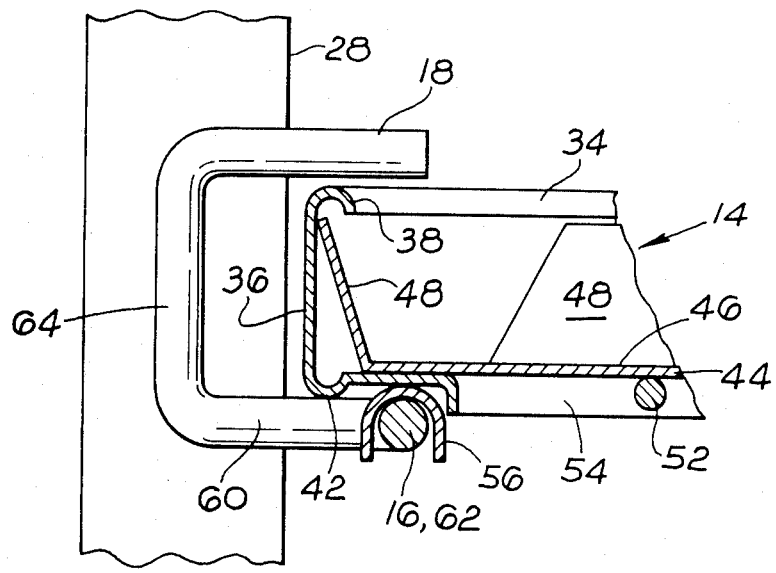
FIG. 4 is an elevational sectioned view through lines IV—IV of FIG. 3.

The tray supports 16 are mounted in pairs, one on each side frame 24 at the same level, and at various levels, for receiving and supporting the trays 14. Opposed tray supports 16 are the mirror image of one another. Each tray support 16 has a front stop peg 58 extending inward from the front corner post 26, a rear stop peg 60 extending inward from the rear corner post 28, and an elongate tray support rail 62 spaced inward of the corner posts 26, 28 and extending between the top pegs 58, 60. The supports 16 are generally U-shaped, lie horizontal, and have legs formed by stop pegs 58, 60 that extend outward to the corner posts 26, 28. The hold-down peg 18 is directly above and spaced upward from the rear stop peg 60. The spacing between the stop peg 60 and the hold-down peg 18 is greater than the height of the tray frame rim 34 but less than the combined height of the frame rim 34 and the support nest 56. The lengths of the support nest 56 and the support rail 62 are sized so that the nest 56 will fit upon the rail 62 and drop down in between the stop pegs 58, 60. The hold-down peg 18 is preferably an integral part of the tray support 16 and is connected by an intermediate spacing upright 64 between the hold-down peg 18 and the rear stop peg 60. Vertically adjacent supports 16 are preferably tied together, as is best shown in FIG. 2 where a connecting upright 60 is in between and connects adjacent levels of tray supports 16 so that they are one integral structure. The tray supports 16 are welded to the corner posts 26, 28 and the preferred attachment is to tuck the uprights 64, 66 into the side frames 24 and weld the connecting upright 66 to the back side of the front corner post 26 and weld the spacing upright 64 to the front side of the rear corner post 28. The transverse spacing between corresponding tray supports 16 on a given level is exactly proper to receive the pair of support nests 56 on any of the trays 14. The tray supports 16 determine the spacing between and structurally connect the corner posts 26, 28.

In the use and operation of the cart 10 and tray 14, the trays 14 are placed at appropriate levels in the cart 10 by being slid in and under hold-down pegs 18 and with the tray nests 56 being dropped down upon the support rails 62. The stop pegs 58, 60 keep the tray 14 from sliding out to either the front or rear of the cart frame 12. The trays 14 are then loaded with plants, flowers or whatever goods are to go to the retailer. The loaded cart 10 is then transferred to and loaded upon a truck, trucked to a retailer, taken off the truck and wheeled to a retailing situs. During truck loading, trucking, truck unloading, and during the wheeling around of the loaded cart 10, the hold-down pegs 18 keep the trays 14 on the tray supports 16 and the goods on the trays 14 are kept on the trays 14 and are not jostled around and messed up.

Although other advantages may be found and realized and various modifications may be suggested by those versed in the art, be it understood that we wish to embody within the scope of the patent warranted hereon, all such embodiments as reasonably properly come within the scope of our contribution to the art.

We claim as our invention:

1. A mobile cart for distribution and retailing of goods comprising:
   (a) a frame having an opposed pairs of front and rear upright corner posts, caster wheels, and a base and a top member structurally connecting said pairs of posts to each other and providing a predetermined transverse spacing between said post pairs;
   (b) at least one discrete and removable tray sized to span across said transverse spacing, said tray having an upwardly extending rim on lateral side edges thereof;
   (c) an inverted U-shaped elongate tray support nest extending fore and aft along the underside of each lateral side edge of said rim and extending downward therefrom;
   (d) a pair of opposed tray supports for each tray, each support having a front transverse stop peg extending inward from a respective front corner post, a rear transverse stop peg extending inward from a respective rear corner post, and an elongate fore-aft support rail interconnecting said stop pegs, each rail being spaced inwardly from a respective pair of posts and having a length that will fit within said U-shaped nest for substantially preventing any fore and aft movement of the tray with respect to the support rail; and (e) a tray hold down peg located above each rear transverse stop peg, the vertical spacing between the hold down peg and the rear transverse stop peg being greater than the height of the rim but less than the combined height of the rim and the nest.

2. The cart of claim 1, in which said front and rear corner posts are discrete from each other with said tray supports being welded to both the front and rear posts of a respective pair of posts and jointly forming a discrete side frame comprised of a rear corner post, a front corner post and a plurality of said tray supports.

3. The cart of claim 2, in which the tray supports are vertically spaced along the entire height of said posts.

4. The cart of claim 1, in which each tray support is a generally U-shaped member with the legs of the U forming the pegs and facing outward.

5. The cart of claim 4, in which the hold down peg is integral with a respective tray support and is connected to the rear stop peg by a rear upright which is spaced outward from the rail.

6. The cart of claim 5, in which adjacent levels of tray supports are integral and are structurally connected by a front upright between the front stop pegs.

7. The cart of claim 6, in which front and rear uprights are welded to the corner posts.

8. The cart of claim 7, in which the front uprights are welded to a back side of a respective front corner post, and in which the rear uprights are welded to a front side of a respective rear corner post.

9. The cart of claim 1, in which said top member is an inverted U-shaped member having cantilevered legs slip fitted to each of the front corner posts.

10. The cart of claim 9, in which said corner posts are slip fitted into sockets on each corner of the base.

* * * * *